United States Patent [19]
Gotham et al.

[11] 3,750,512
[45] Aug. 7, 1973

[54] CUTTING MACHINE

[75] Inventors: Stanley T. Gotham, Somerset, Mass.;
Gerald A. Thurber, Pawtucket, R.I.

[73] Assignee: Cumberland Engineering Company Inc., Pawtucket, R.I.

[22] Filed: Apr. 26, 1972

[21] Appl. No.: 247,713

[52] U.S. Cl............... 83/356.3, 83/447, 83/450, 83/859, 83/906
[51] Int. Cl............................................ B23d 25/00
[58] Field of Search................... 83/355, 356, 356.1, 83/356.3, 373, 447, 450, 544, 859, 906, 913

[56] References Cited
UNITED STATES PATENTS
2,812,815    11/1957    Quinsey et al.................... 83/906 X

*Primary Examiner*—J. M. Meister
*Attorney*—Albert P. Davis and Burnett W. Norton

[57] ABSTRACT

A restraining and hold-down apparatus for use in conjunction with a machine (for cutting thin sheet material) having a feed table, cutting means located at the inner end of the table, and top and bottom feed rolls at the outer end of the table, comprising a main plate hinged at the outer end of the feed table and resiliently held in proximity to the feed table, a pressure pad attached to the inner end of the plate and adjacent the cutting means, the pad being resiliently biased toward the table, and resilient means for biasing the top feed roll toward the bottom feed roll and biasing the rear end of the main plate toward the table simultaneously with the top roll.

16 Claims, 11 Drawing Figures

Patented Aug. 7, 1973

Patented Aug. 7, 1973

CUTTING MACHINE

BACKGROUND OF THE INVENTION

In the use of cutting machines for plastic materials, such as granulators or dicing machines, thin synthetic resin plastic materials often cause trouble in that the material may wrinkle or crumple during the feeding and cutting operations. Accordingly, it is necessary to provide some kind of a restraining device in order to stop this adverse effect. Attempts have been made hitherto in this type of machine and in other machines, to provide suitable hold-downs, but so far such other attempts have not provided to be particularly successful.

Possibly one reason for this is that sometimes plastic materials have variable thicknesses, and no provision has been made in the prior art devices to allow for this. Another difficulty has been that it has not been possible to easily adjust the pressure applied by the hold-down means to the material being fed. Still further difficulties lie in the fact that in many machines it is necessary or advisable to provide a safety gate in front of the cutting means in order to prevent accidents, and such gates complicate the hold-down mechanism if the latter must be close to the cutting means. Also, it is oftentimes desirable to lift the entire hold-down device away from the feed table in order to introduce new material, or to clean off the table itself. The prior art machines do not provide satisfactory solutions to these problems in one machine.

Another problem that needs to be solved is that of providing a restraint on the sheet material while being fed to the cutting means of such nature that up to close proximity with the cutting means the material is restrained, without pressure, against motion away from the feed table, but when it is in close proximity to the feed table it is held thereagainst with pressure but can still move into the cutting means.

SUMMARY OF THE INVENTION

Accordingly, it is the general purpose of this invention to provide restraining and hold-down apparatus which will satisfy the requirements of both the manufacturers and users of the above named cutting machines, and which solves the several problems or minimizes their adverse effects.

Accordingly, among the several objects and advantages of the invention may be noted the following:

One object of the invention is the provision of resilient restraining means for maintaining a sheet material in close proximity to a feed table of a cutting machine but without pressure against the table.

A second object is the provision of a machine of the above kind incorporating resilient hold-down means for holding the sheet material against the bed-knife of the cutting mechanism of the machine just prior to being cut.

Another object of the invention is the provision of apparatus of the above kind, in which means are provided for lifting the restraining means and the hold-down means away from the table for the introduction of new material, adjustment of the cutting means, or cleansing of the machine.

A still further object of the invention is the provision of such a machine in which a safety gate is provided, the safety gate providing the means for biasing hold-down means against the material in close proximity to the cutting means.

Yet another object of the invention is the provision of apparatus of any of the above kinds, in which the apparatus is so resiliently mounted with respect to the table as to permit it to move toward and away from the table in order to adapt to varying thicknesses of the sheet material being fed.

Another object of the invention is the provision of means for supporting, independently of each other, the forward and rear ends of the restraining means so that it can accommodate changing thicknesses of the material passing along the table of the cutting machine.

A further object of the invention is the provision of control means for the restraining means, the hold-down means and the safety gate so operative that the safety gate is moved away before the hold-down means is moved away from the table.

Other objects and advantages will be in part obvious and in part pointed out hereinafter.

Accordingly, the invention comprises the elements and conbinations of elements, features of construction, and arrangements of parts which will be exemplified in the structures hereinafter described and the scope of the application of which will be indicated in the appended claims.

In the accompanying drawings, in which several embodiments of the invention are illustrated:

Throughout the drawings, similar reference characters indicate corresponding parts; and dimensions of certain parts as shown may have been modified or exaggerated for the purpose of clarity of illustration and understanding of the invention.

Figure 1:
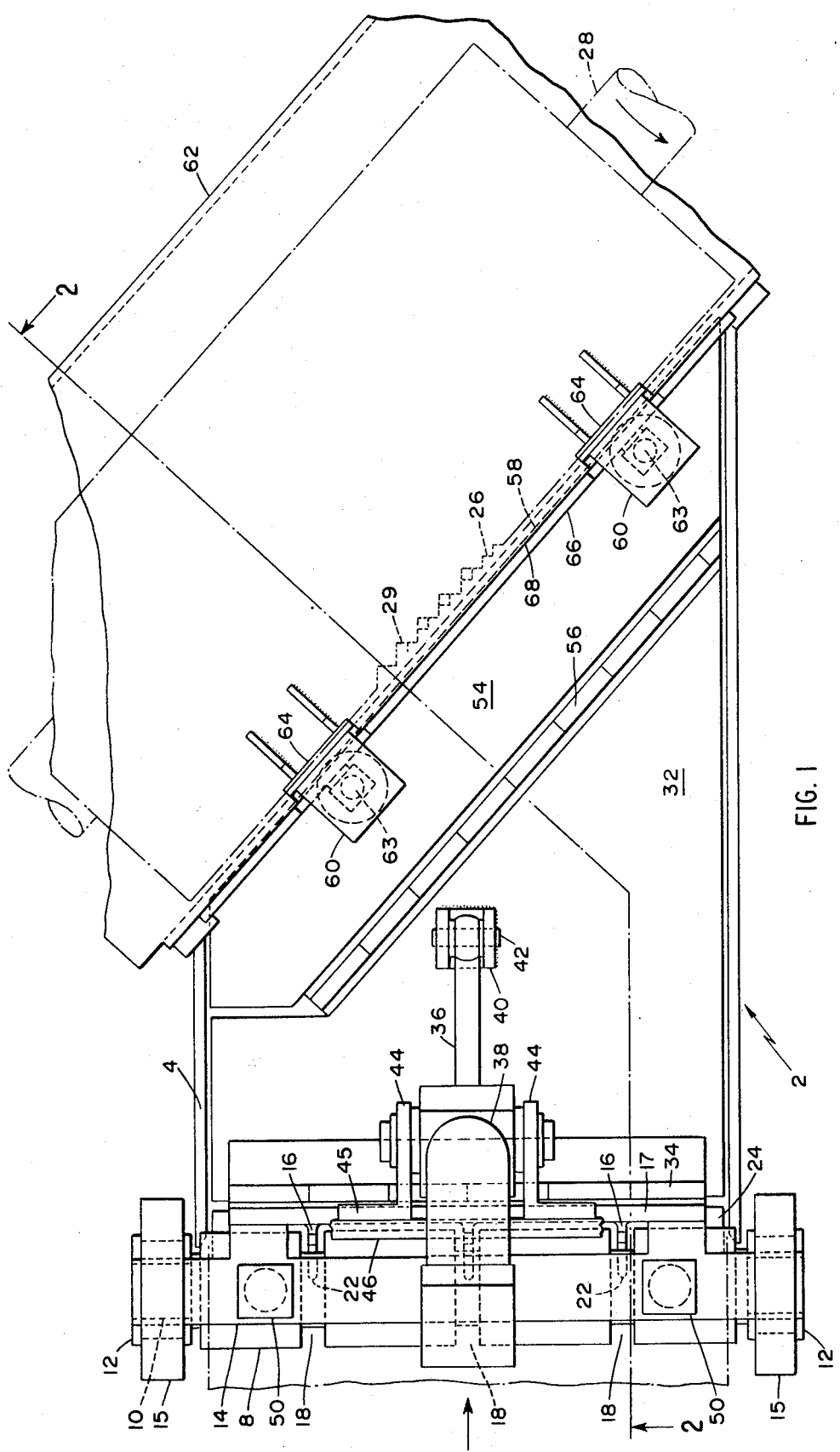
FIG. 1 is a plan view, partly in section and partly schematic, of a first embodiment of the invention.
Figure 2:
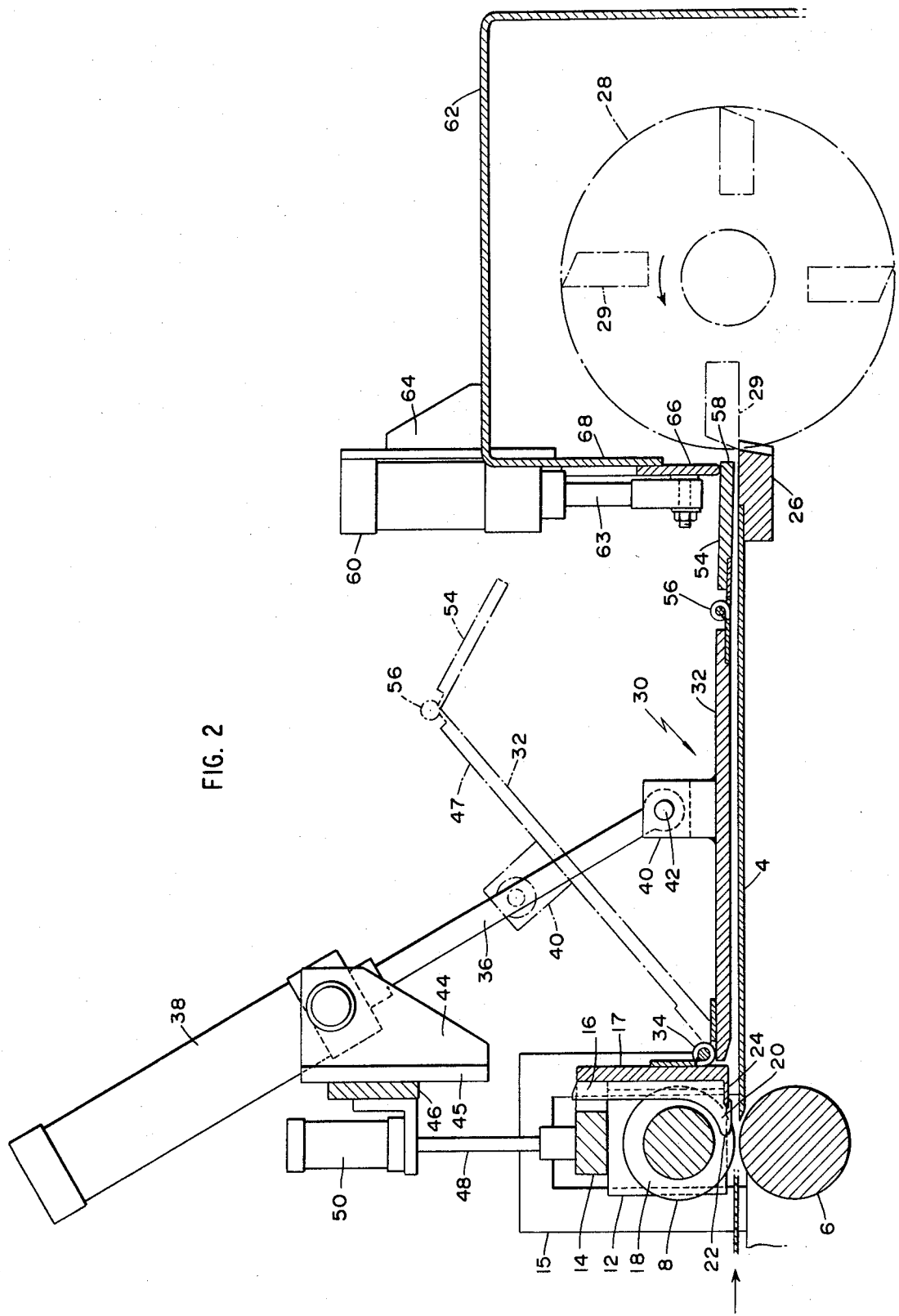
FIG. 2 is an elevation taken in the direction of site lines 2—2 on FIG. 1.

Referring now to FIGS. 1 and 2, there is shown somewhat schematically a basic sheet cutting machine 2, for example, a plastic dicing machine used in the plastics industry. Such a machine, as explained before, is used to cut sheet materials into small squares or cubes. Also as explained above, when sheet materials are used, the material tends to wrinkle or crumple as it is being fed in the machine.

The machine comprises a feed table 4 having the nip rolls 6 and 8 at the entrance end of the table, these rolls being powered (at least as to the bottom one) in order to move material toward the cutting means. Preferably the rolls are knurled or corrugated on their peripheral surfaces in order to "bite" the material. Also, as conventionally made, while each of the rolls may be one continuous length, it is preferred that at least one of the rolls comprise short cylinders separated by intervals, these separate cylindrical rolls being keyed onto their respective bearing shaft 10. Such keying is conventional and is not shown in detail here. Suitable end bearings 12 are provided for shaft 10, these being tied together at their tops by the tie bar 14, the bearings with the nip roll suspended therein being slidable in an up and down direction in bearing standards 15. Attached to the tie bar 14 so as to move upwardly or downwardly therewith are the vertical fingers 16, there being provided one finger for each of the spaces 18 provided between rolls 8 of the upper nip roll. It will be noted that the lower end 20 of the fingers 16 curves inwardly as illustrated toward the axis of the nip roll so as to project below the shaft 10, and that the nose 22 of each finger projects nearly underneath the axis of the nip roll, and is curved. By this means, the fingers are used to guide material between the nip rolls, and also to prevent thin sheet material from wrapping itself around the top nip roll. A stripper blade 24 is attached to the lower ends of a support bar 17.

At the forward end of the feed table 4 there is provided a conventional cutting means such as rotary dicing apparatus. This dicing apparatus is illustrated schematically since it is well known, but for the purpose of this description comprises a bed kinfe 26 (see FIG. 2) at the forward end of the feed table the bed knife being at an angle to the feed bed, and a rotor 28 having a plurality of knives 29 cooperating with the bed knife. the rotary knife being driven conventionally by a motor not shown. Each of the bed and rotary knives is provided with teeth, the function of which is to cut dice from the sheet material.

Since the details of such cutting or dicing machines are well known, further description will not be given here, a typical example being one made by Cumberland Engineering Company, Inc. and illustrated in their Bulletin 700.

Overlying the feed table is the main restraining means and support plate 30 of this invention. It comprises a rigid plate 32 of substantially the same width as the feed table 2. This support plate is attached by the pivotal means 34 (such as a hinge) to the support 17 for the fingers 16, so that the rear end of plate 32 may be raised or lowered with respect to the feed table. For the purpose of such raising and lowering, a piston 36 of fluid actuated cylinder 38 is provided, which is pivotally attached by pin 42 at the outer end thereof to a clevis 40 mounted on support plate 32 at a suitable distance from the hinge 34. Cylinder 38 is pivotally supported in clevis bracket 44 which is fastened to upright 45 which in turn is supported by cross bar 46 extending across and attached to the machine bed. It is obvious with this construction, that when the piston 36 is retracted into the cylinder 38, the support plate will rise to the position shown by the dotted lines 47 in FIG. 2.

Thus, for cleaning the table or gaining access to the cutting mechanism, the plate 32 may be raised away from feed table 2 by actuating cylinders 38 and piston 36 to draw plate 32 to the dotted line position 47 (FIG. 2).

Attached to the tie-bar 14 are the pistons 48 and a pair of fluid-actuated cylinders 50, the latter being fastened to the bracket 45. Upon suitable actuation of the cylinders 50, tie bar 14 is raised or lowered and thus bearings 12 are moved up and down to move roll 8 toward or away from bottom feed roll 6. The force exerted by roll 8 against material being fed into the machine is adjusted by varying the pressure of the fluid driving the cylinders. The force actuating the roll 8 will be resilient if air is used to actuate the cylinders 50. So also, by using air to actuate cylinder 38, a certain amount of resiliency will be obtained in holding plate 32 in its downward position.

Referring again to FIG. 1, attached to the forward end of the support plate 32 is a pressure pad 54, the attachment being done by means of the elongated hinge 56 which is attached by conventional means to both the forward edge of the support plate and the rear edge of the pressure pad. It will be noted that the forward edge 58 of the pressure pad is in close proximity to the cutting teeth of the cutting mechanism. Thus, by the use of this hold-down device, pressure can be maintained downwardly against the material being fed to the machine almost up to the place where the cuts are made at the edge of the material.

A further advantage and object of this invention is that a noise reduction is obtained by the prevention or at least greatly minimizing any flapping of this sheet material against the feed table and bed knife.

Means are provided for applying a biasing force on the pressure pad to urge it toward the plate. One means comprise a pair of fluid operated cylinders 60 which are mounted on the enclosure 62 (surrounding the rotary knives) by means of brackets 64. The pistons 63 of cylinders 60 extend in a downward direction, and at their lower end supported by conventional means is an elongated safety gate 66 which extends across the throat of the cutting mechanism from one side of the feed table to the other side and engages the forward edge portion 58 of the safety gate. Wall 68 of the enclosure 62 extends downwardly as shown, and the safety gate 66 is positioned so as to slide smoothly up and down against the face of wall 68.

It will be observed from FIG. 2 that when in position, the lower edge of the safety gate and thus the downward thrust of the pistons 63 is exerted against the forward edge 58 of the pressure plate. Thus the safety gate has two functions. The first function is to act as a safety gate, and the second function is to act as a resilient biasing means for the pressure pad. The amount of force exerted against the pressure pad can be controlled by the amount of travel of pistons 63, and also the amount of fluid pressure in the cylinders 60.

Figure 3:
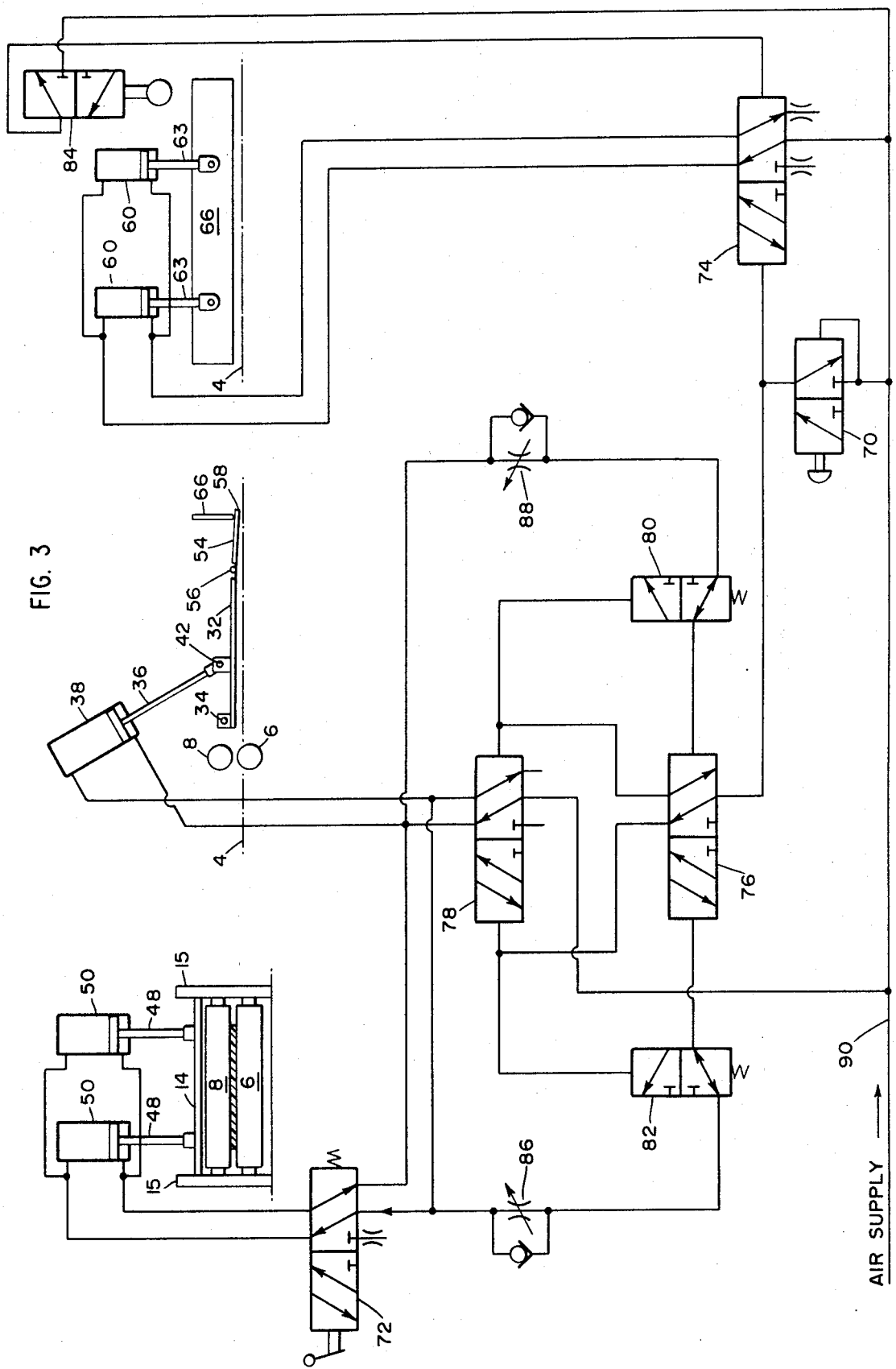
FIG. 3 is a schematic control circuit for the FIG. 1 invention.

A control circuit for the above embodiment is illustrated in FIG. 3, in which the following structural elements already described are shown schematically: Cylinders 50 and their pistons 48 for the purpose of raising and lowering the tie-bar 14 are shown, the latter in turn raising and lowering the nip roll 8 which cooperates with the lower feed roll 6 to feed material into the machine.

The cylinder 38 and its piston 36 are shown for raising and lowering the support plate 32. Shown also is the pressure plate 54 attached to plate 32. Safety gate 66 is shown, together with the cylinders 60 and pistons 63 for raising and lowering the safety gate.

The control circuit as designed is basically a fluid operated one (preferably by air) and contains the following manually operated and pilot operated valves as follows: Manually operated valves 70 and 72; pilot operated valves 74, 76, 78, 80 and 82. Valve 84 is mechanically operated by motion of the safety gate. In addition, an adjustable bleed valve 86 is provided as well as the adjustable orifice bleed valve 88. An air supply (not shown) with its attendant filters is provided which introduces an air supply into the line 90.

The connecting air hoses are not numbered, since the connections are clearly shown on the drawing.

The operation of the pneumatic circuit is as follows: Assuming that all of the respective pistons are extended so that the nip roll 8 has been moved downwardly to engage sheet material progressing into the machine between the nip roll 8 and 6; the piston 36 has been extended so that the support plate 32 is in its downward position; the cylinders 60 have been actuated so that the pistons 63 have extended to move the safety gate 66 downwardly so that it biases the pressure plate 54 downwardly toward the table. With the parts in this position, then to raise the upper feed or nip roll 8 and the support plate 32, the following steps are made with ensuring steps in the sequencing of the control circuit.

Valve 70 is momentarily actuated. As a result of this, pilot air is directed to the one pilot entrance of the valve 74 which causes its valve spool to shift from its position to its other position to allow supply air to enter and retract the cylinders 60 which will lift safety gate 66. At the same time, pilot air from valve 70 is passed through the valve 76 to the pilot entrance of valve 78, which in turn causes supply air passing through the latter valve to retract the piston 36 of cylinder 38. At the same time, this air passes to cylinders 50 via valve 72 and actuates pistons 48 to lift the tie bar 14 to lift the nip roll 8 away from the bottom feed roll 6.

When safety gate 66 reaches the top of its upward movement, it mechanically actuates valve 84, the spool of which is thus shifted to direct pilot air to the right-hand pilot entrance of valve 74, thus allowing supply air to cause the cylinders 60 to extend their pistons 63 to move safety gate 66 to its down position where it protects an operator from access to the rotary cutting mechanism.

It is to be noted that when the right-hand pilot of valve 78 is operated, pilot air is also directed to valve 80 the spool of which moves to allow supply air to go to the right-hand pilot of valve 76, thus preparing the latter for lowering the support plate 32 and the nip roll 8, while not so actuating it thusly at this time.

In order to lower the nip roll 8 into its operating position, and also to activate the cylinder 38 to lower the support plate or platen 32, the following is done:

Just as in raising the nip roll 8 and plate 32, the valve 70 is momentarily operated manually. Again, as before, the cylinders 60 are actuated in order to raise the safety gate 66 to its upper position. At the same time, pilot air from the valve 70 is passed through valve 76 (previously actuated, during the above operation to raise plate 32, which puts it in the correct position), the air passing through the left-hand pilot entrance of valve 78 which in turn permits supply air to pass through this valve and into the cylinders 50 and 38, thus causing their respective pistons to extend. As these pistons extend, the nip roll 8 is moved down toward the feed roll 6, and the plate 32 is moved down toward the feed table of the machine. At the same time, pilot air is directed to valve 82 which allows supply air to go to the left-hand pilot entrance of valve 76, thus preparing this valve for raising the platen 132 and the upper feed roll 8 again when desired.

As before, when the safety gate 66 reaches the upper end of its stroke, valve 84 is again mechanically actuated, and the gate will now recycle to close downwardly, this time coming to rest against the forward edge of the pressure plate 54 which in the meantime has been lowered into position by extension of the piston 36 from its cylinder 38. The timing of these respective parts is important, of course, and by adjusting the above bleed control valves, the gate will close only after the plate 32 and pressure pad 54 are in their downward positions.

When starting up the machine for a new batch of sheet material, it is not necessary for the support plate 32 and its pressure pad 54 to be raised. That is, by manual operation of the valve 72, the upper feed roll 8 can be raised to permit the introduction of a new sheet material into the machine and into the tunnel formed between the plate 32 and the feed table of the machine.

When once in this position, then the upper feed roll or nip roll 8 may be lowered automatically by actuating manually operated valve 72 to return its spool into the position to lower the nip roll 8 toward the feed roll 6.

It is to be noted that with this control circuit, when the support plate 32 and the upper feed roll 8 are both raised, it is not possible to lower the upper feed roll independently of the support plate 32. This feature provides a safety measure for the machine.

Figure 4:
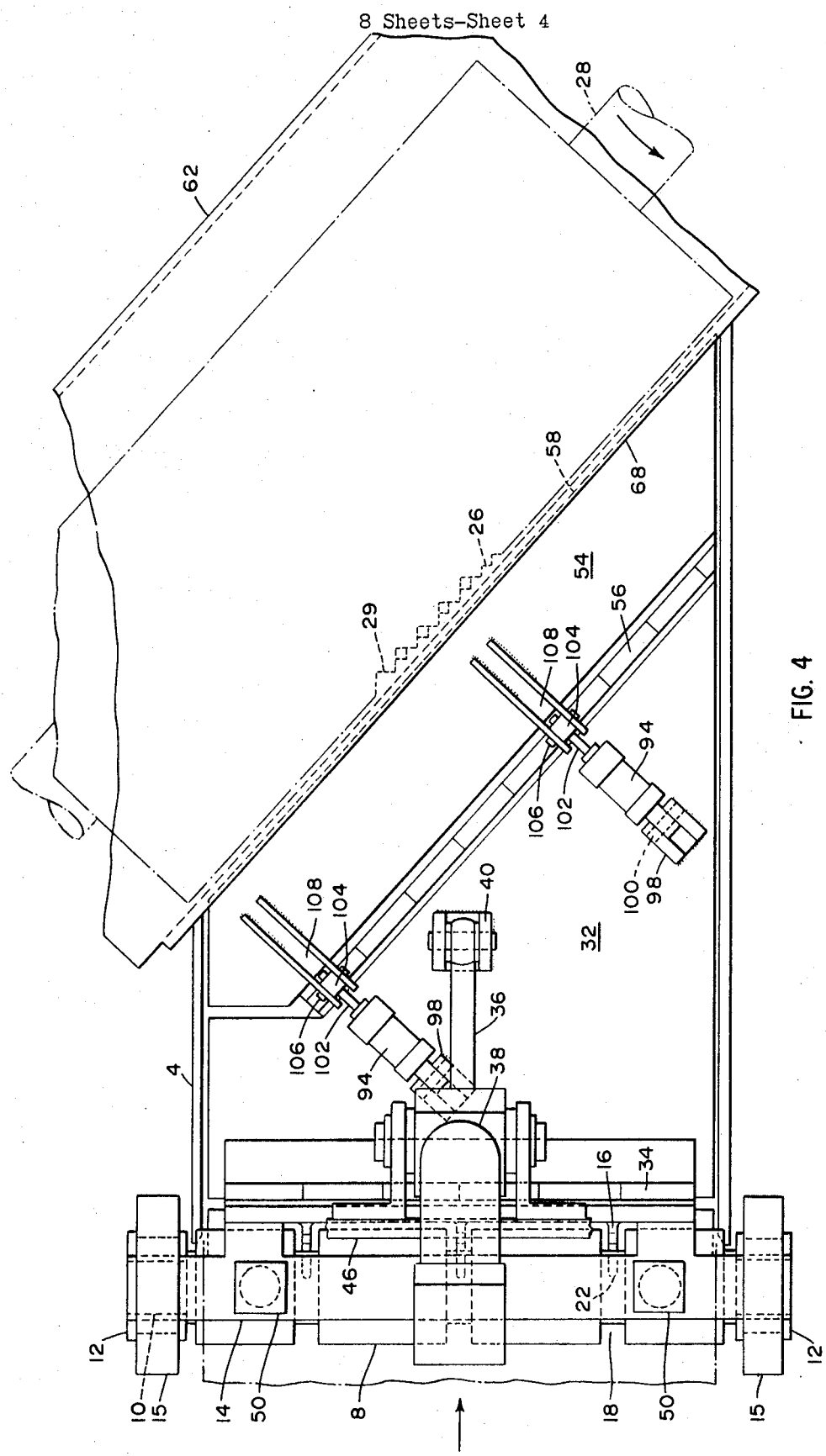
FIG. 4 is a plan view of a second embodiment of the invention, partly schematic.
Figure 8:
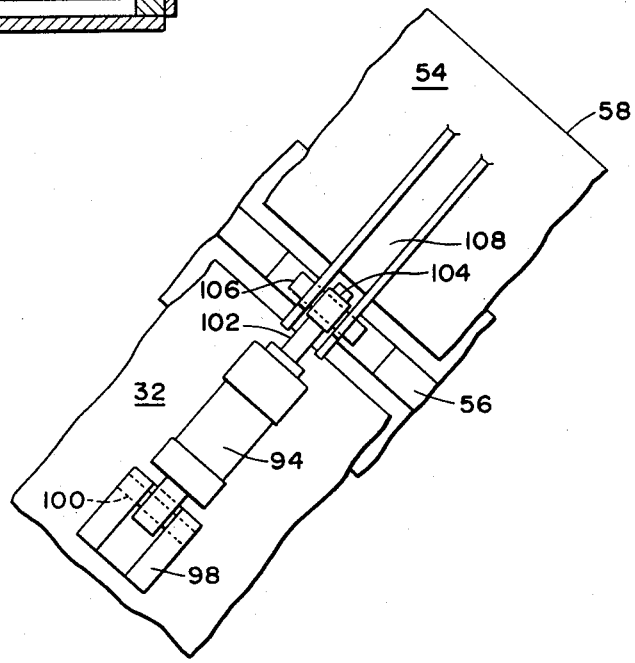
Figure 9:
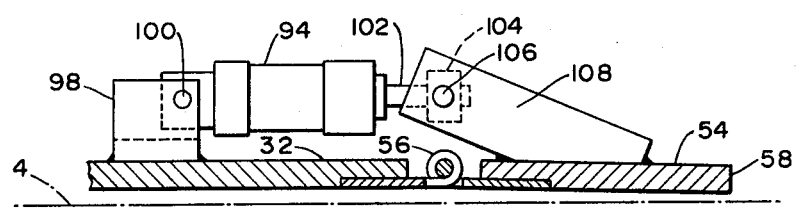

Referring now to FIG. 4, a second embodiment of the invention is shown which differs from the first embodiment in that no safety gate is provided and instead of using the safety gate to bias the pressure pad downwardly to the extent desired, additional or different biasing mechanisms are used. In general, FIG. 4 shows several of the elements shown in FIG. 1. That is, the nip roll 8 is shown, the bearing therefor and the standards for the bearings, the tie bar 14, the cylinder 38 and its piston 36 which is attached to the pressure plate 32 by means of the clevis 40 as in the FIG. 1 embodiment. The pressure plate 54 is again shown. However, it will be observed that there is no safety gate and therefore no cylinders for actuating the same. In this embodiment, the pressure plate 32 is biased in a downward direction by means of auxiliary cylinders 94. (A reference to FIGS. 8 and 9 will show these auxiliary cylinders in greater detail.) The rear end of the cylinders is attached in each case to the main support plate 32 by means of a clevis 98, the clevis and the tongue of the cylinders 94 bieng bored out to receive a suitable pin 100.

The pistons 102 of the cylinders 94 have their forward ends provided with a boss 104 suitably bored to receive a connecting pin 106. Attached to the pressure pad 54 are a pair of parallel fingers 108 spaced apart sufficiently to receive the block 104. The ends of the fingers 108 are suitably bored to receive the pin 106.

As a result of this construction, when the pistons 102 of the cylinders 94 are extended, this will thrust the pressure pad 54 downwardly toward the feed table of the apparatus. When the pistons are retracted, this will cause the pressure pad to move away from the feed table. By the use of air in the pistons 94, the force exerted to move the pressure pad downwardly against the table, or against the stock being fed therealong, will be resilient due to the resilience of the air supply.

The control circuit shown in FIG. 3 is not necessary for this second embodiment, because since there is no safety gate, all that is necessary is to actuate the cylinder 38 to retract its piston 36 when it is desired to raise the support plate 32 and the pressure pad 54 away from the feed table. When it is desired to lower the support plate 32 and pad 54 toward the table, all that is necessary is to actuate the cylinder 38 again in order to extend its piston 36 and thus move these parts toward the feed table. In view of the fact that the main cylinder 38 is mounted on the machine itself, the cylinders 50 for raising and lowering the nip roll can be operated independently of the actuation of the main cylinder 38 and the movement of support plate 32 and pressure pad 54.

Figure 5:
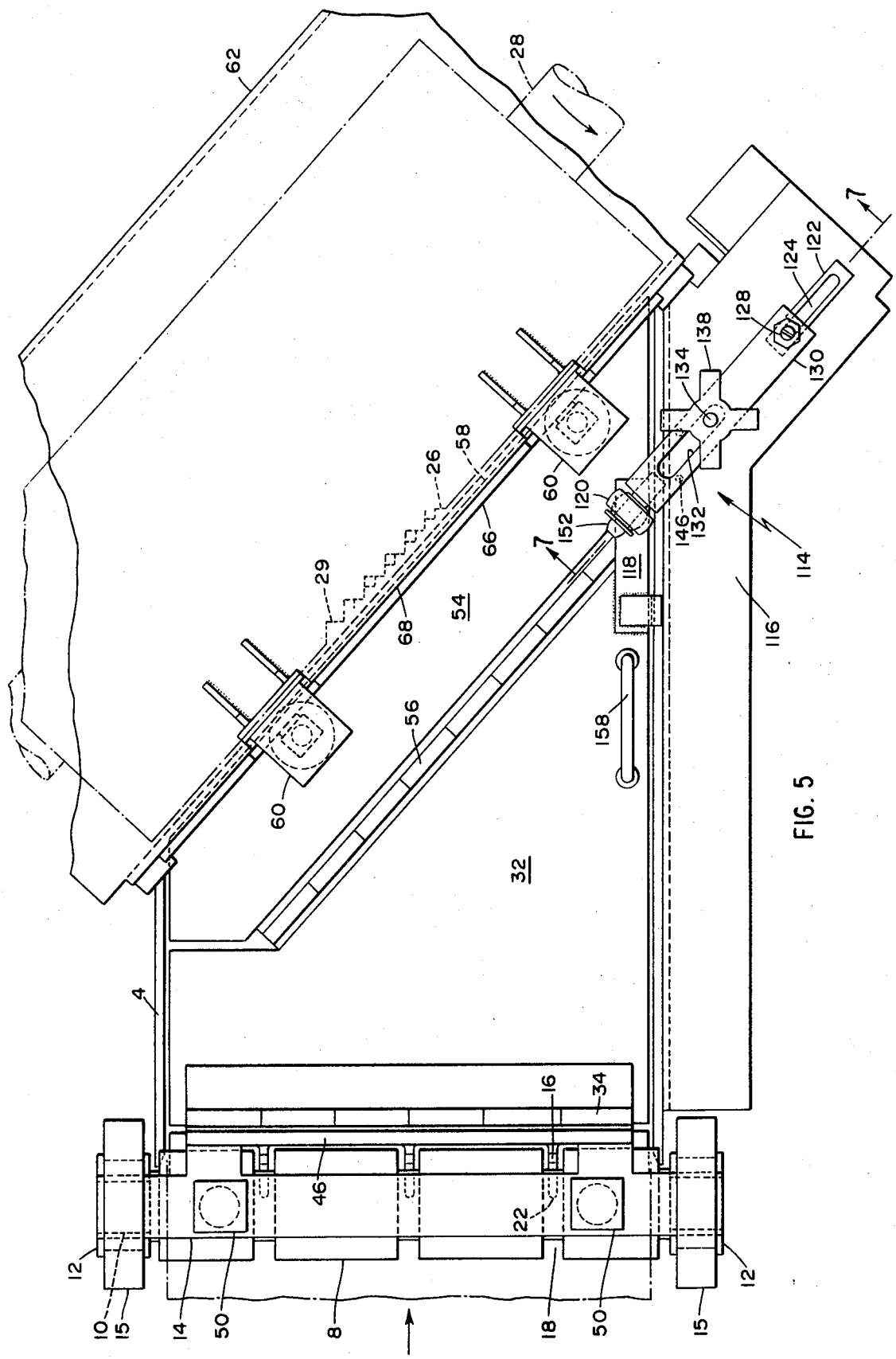
FIG. 5 is a plan view of a third embodiment of the invention, shown partly schematic.

Referring now to FIG. 5, a third embodiment of the invention is shown, in this instance one that does not use the main cylinder 38 of the FIG. 1 embodiment. It has the nip roll 8 with its analogous bottom roll 6 not shown, the nip roll 8 being mounted in its bearings in the standards 15, the main support plate 32 attached pivotally by the hinge 34 to the support or the stripping fingers 16 as in the previous embodiment. The pressure pad 54 is the same as the FIG. 1 embodiment, the rotary cutting means is the same, and also in this embodiment are the cylinders 60 for actuating the safety gate 66. The safety gate is used as the means for biasing the forward edge of the pressure plate 54, just as in the FIG. 1 embodiment. The control of the safety gate, being under the control of the cylinders 60. In all embodiments, it is desirable if not necessary, that the forward edge of the main support plate 32 be resiliently biased in a downward direction toward the feed table. In this instance, the resilient biasing is done not by the master cylinder 36 and its piston 38 (both being removed from this embodiment), but by means of a separate resiliently biasing toggle device indicated generally by numeral 114.

Figure 7:
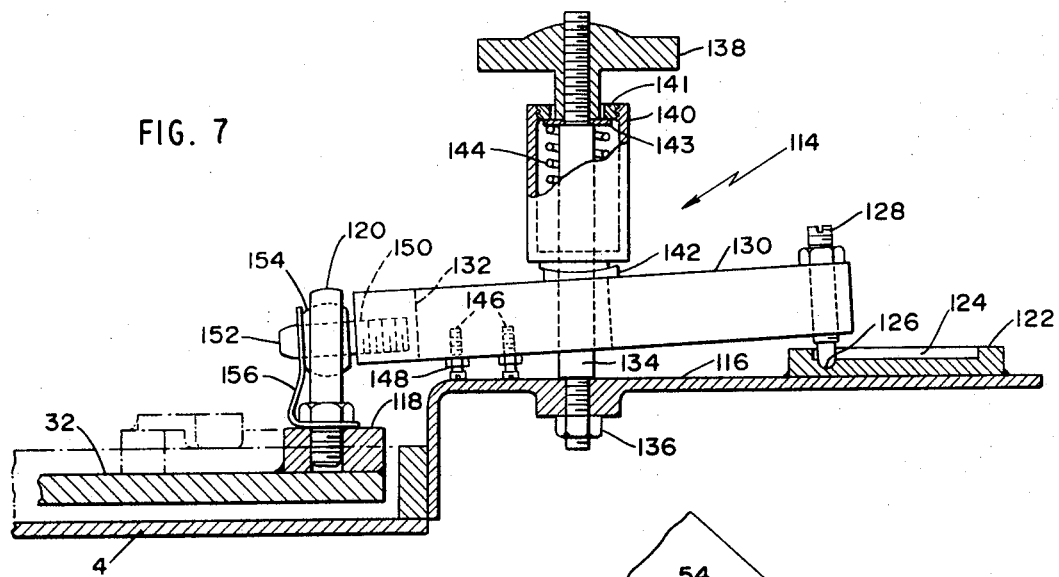
FIGS. 7, 8 and 9 are views, enlarged in scale as compared to FIGS. 1, 2, 4, 5 and 6, given to show in greater detail and clarity certain operating parts of the above embodiments.

Referring to FIGS. 5 and 7, a resilient toggle mechanism 114 is mounted on a plate 116 which is attached to the feed bed of the cutting machine, and extends laterally on one side thereof. Mounted on the forward end of main plate 32 is a small pad 118 which supports the swivel bearing 120. Attached to the plate 116 is an elongated pad or bar 122, the bar being bolted or welded in place, and having in the top surface thereof an elongated groove 124. At the forward end of the groove 124 is provided a conical depression 126 which receives the pointed end of a set screw 128. Set screw 128 is threaded into the rear end of a toggle or lever 130. This lever is provided with the slot 132 through which passes a bolt 134 firmly fastened, as by means of the lock nut 136 to the bracket 116. The upper end of the bolt is threaded, and receives thereon the threaded hand wheel 138. A hollow cylinder or barrel 140 is placed over the bolt 134 and has a pressure pad 142 at its lower end bearing against the upper edges of the slot 132. A closure member 141 is threaded into the top of barrel 140, through which passes the upper threaded end of bolt 134. Received in the barrel 140 is a compression spring 144 against which a washer 143 and the end of the hand wheel bears when the latter is screwed against the shoulder on bolt 134. Screwed upwardly into the bottom edges of the sides of slot 132 are a pair of adjustment screws 146, these being locked in their adjusted position by means of the conventional lock nuts 148.

From this construction, it will be seen that when the hand wheel 138 is screwed downwardly on the fixed bolt 134, it compresses spring 144 which reacts to force the barrel 140 against the bar 130, the latter having as its resistive pressure points the pair of adjusting screws 146 and the end of the bolt 128 which rests in the conical recess 126. By loosening the hand wheel 138 the screw 128 may be raised from the socket 126 and the bar 130 can then be slid backwardly.

At the forward end of the bar 130 is provided a hole 150 into which is screwed tightly a short stub shaft 152. The stub shaft is sized to fit smoothly in a wobble bushing 154 mounted in bearing 120 which is fastened, as stated above, to pad 118 on plate 32. A spring member 156 aligns bushing 154 in bearing 120.

By this construction, it is to be noted that if the support plate 32 wishes to move upwardly away from the feed table of the machine because of uneven thickness of the material passing between the support plate and the table, the forward end of the support plate can lift against the resiliently resistive downward thrust of the left-hand end (as drawn) of the bar 130 due to the downward thrust of spring 144.

A handle 158 is attached to plate 32 to be used in lifting and lowering the latter. The cylinders 60 are used to resiliently bias the forward edge of the pressure pad 54 downwardly as in the FIG. 1 embodiment. The cylinders will be first used to raise the safety gate, and then plate 32 and pad 54 can be raised upwardly. The safety gate can then be lowered to guard the cutting mechanism.

Figure 6:
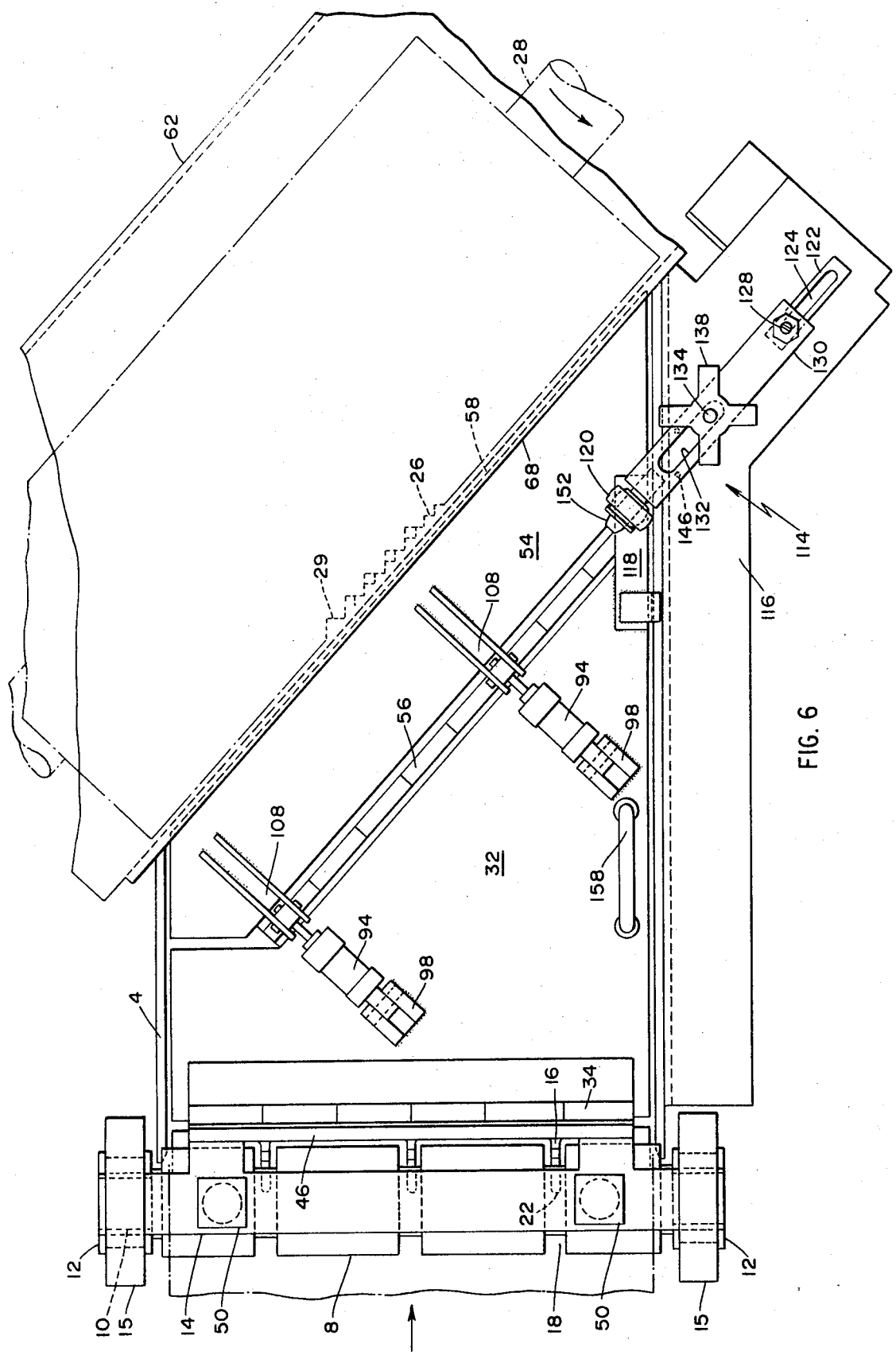
FIG. 6 is a plan view of a fourth embodiment of the invention, shown partly schematic.

Referring now to FIG. 6, a fourth embodiment of the invention is shown, this being identical to the embodiment shown in FIG. 5, with the exception that the safety gate 66 is omitted, and also the cylinders 60 and their pistons 63. The means for biasing the pressure pad 54 downwardly (the pressure pad being attached by means of the hinge 56 as in the other embodiments to the main support plate 32) are the auxiliary cylinders 94 shown in the FIG. 4 embodiment, these being attached and being actuated just as described for that embodiment. That is, one end of the cylinder is attached to the clevises 98 which in turn are attached to the support plate 32, and the pistons of the cylinders are pivoted to the fingers 108 which are attached to the pressure pad 54. The toggle mechanism 114 shown in FIGS. 5 and 7 is used in this FIG. 6 embodiment to resiliently hold support plate 32 in position, and the combination of the toggle mechanism plus the cylinders 94 serves to bias resiliently the pressure plate downwardly the proper amount.

Instead of using the auxiliary cylinder bias for the pressure pad as shown in FIGS. 4 and 6, a spring operated auxiliary biasing means for the pressure pad 54 may be used. This is shown in elevation in FIG. 10 and is constructed as follows: A pair of brackets 164, spaced along the forward edge of the support plate about the same amount as are spaced the clevises 98, are attached to the support plate 32 by conventional means such as welding. A threaded bolt 166 passes freely through a hole 168 and extends forward toward the pressure pad. Mounted on the bolt is a spring 170, a washer 172 and a pair of nuts 174 one of which act as a lock nut. The forward end of the bolt 166 ends in the eye 176 through which passes a pin 178, the pin in turn passing through suitably bored bearing holes formed in the fingers 180 which are fastened to the pressure pad 54 just as are fastened the fingers 108 of FIG. 4, for example. At the other end of the bolt 166 is furnished the stop pin 182.

Figure 10:
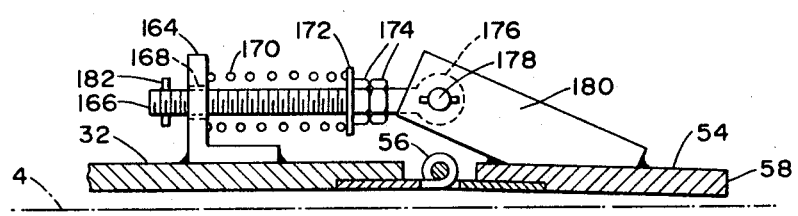
FIG. 10 is an illustration of a different biasing means, which when combined with other common parts, forms a fifth embodiment.

It is obvious that with this construction when one screws the nut 174 to the left as viewed in FIG. 10, the result is first to draw the stop pin 182 against the bracket 164, and further threading of the nuts 174 will have the effect of compressing the spring 170. During the first part of the motion of the bolt 166 to the right under the influence of the nuts 174, the fingers 180 will move the pressure plate downwardly. Once this is done, then further compression of the spring 170 will apply a resistive force which will resist any tendency of the pressure plate 54 to rise upwardly from the feed table. Of course, this resistive force downward is resilient.

Figure 11:
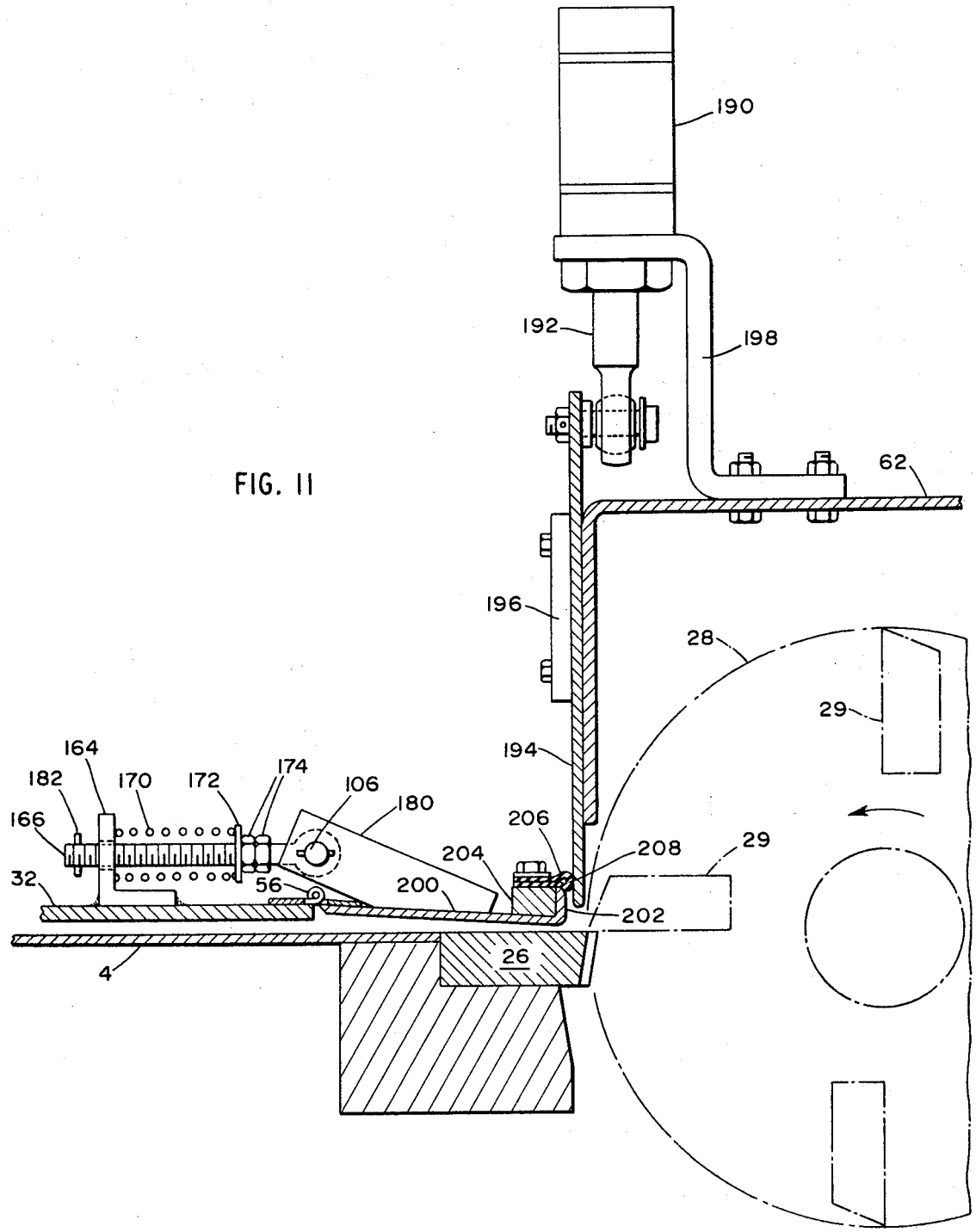
FIG. 11 is a sectional elevation showing a sixth embodiment of the apparatus.

Referring now to FIG. 11, a seventh embodiment of the invention is shown, like the previous embodiments in many respects, but differing in some.

The feed table 4 is shown, bed knife 26 and support therefor, and rotor 28 and fly knives 29. Two cylinders 190 are provided (of the same general type as cylinders 60), whose pistons 192 are fastened to, support, and move a safety gate 194, the ends of the latter sliding in suitable channels 196 mounted on knife housing 62. Cylinders 190 are mounted to housing 62 by brackets 198 and are spaced apart as shown for cylinders 60 in FIG. 1. They are positioned so that the safety gate can be moved down against the bed knife 26 in front of, but not touching, the fly knives 29.

A support plate 32 is provided as in the previous embodiments, and has its rear edge hinged to the supports 17 as in the FIG. 1 embodiment. The forward or inner end of the support plate is held resiliently in proximity to the feed table by a toggle mechanism 114 as shown and described in reference to FIG. 6.

A hold-down or pressure pad 200 is provided and is hinged to the forward end of support plate 32, as is shown in FIG. 6. The spring biasing means 164-182 as shown and described in reference to FIG. 10 is used to resiliently bias the forward portion of pressure pad 200 toward the table and the bed knife by means of the spring actuated arms 108 which are fastened to the pressure pad 200 as by welding.

Pressure pad 200 differs from those of the previous embodiments in that it has a turned-up forward lip in which is fastened a lengthwise extending filler block 204. A soft seal strip 206 of elastomeric material such as rubber or Neoprene is folded as shown and is attached to the block so that the folded edge projects beyond the lip 202 and bears against the lower edge portion of the safety gate 194 when the machine is operating.

Except as above, the remainder of the feed apparatus and the entire machine is constructed as shown in FIG. 5. (No main cylinder 38 is used, since toggle 114 provides the restraining means for support plate 32.) Feed rolls 6 and 8 are provided, and the cylinders 50 to move and adjust the rolls, the latter being guided as in the FIG. 1 embodiment.

The operation of the FIG. 11 embodiment is as follows. The support plate 32 is adjusted by means of toggle 114 so that it provides a tunnel (with feed table 4) in which sheet material is fed by rolls 6 and 8 toward the cutting edges. The plate 32 prevents the material from wrinkling, but does not press the latter against the table. On reaching pressure pad 200, the material is now forced against the bed knife 26 just prior to being cut. In this manner, in this embodiment as in the previous ones, the material is prevented from crumpling by the tunnel, and is prevented from vibrating by the pressure plate whose bias has previously been adjusted, in this embodiment, by the means 164-182 and fingers 108.

When it is desired to lift the plate 32 and pressure pad 200 away from the table, safety precautions are observed as follows: The cylinders 190 are first actuated to lower the safety gate until it rests against the bed knife 26. Plate 32 is then raised, carrying with it the pad 200. The safety gate prevents the operator from coming into accidental contact with the machine knives. It also prevents tools being used from accidentally hitting the fly knives. If desired, after the machine has been stopped, the safety gate may be raised to permit full access to the knives.

Also, if desired, control means may be designed to prevent the withdrawal of the plate 32 and pressure pad 200 until the safety gate has been moved to its downward position.

Throughout the embodiments, it is to be noted that where the safety gate 66 is to be used, to bias the pressure plate 54 downwardly toward the table, then neither the auxiliary cylinder biasing means or the spring biasing means arrangement described above is to be used.

Material to be cut is fed between the nip rolls 8 and the corresponding drive rolls 6, proper pressure between these rolls being adjusted by the cylinders 50. The fingers 16, as pointed out above, constitute the means for preventing thin sheet material from wrapping around the nip rolls 8, and as a result the material is fed between the support plate 32 and the feed table 4 toward the pressure pad 54. The adjustment of the support plate with respect to the feed table 4 is such as to just clear the material being fed therethrough. Material eventually reaches the pressure plate 54, and then the bias toward the table on this pressure pad is so adjusted by adjusting the air pressure in cylinders 60 and thus the force exerted by safety gate 66 so that the material can be moved smoothly between the forward edge of the pressure pad and the table so as to feed into the cutting mechanisms comprising the bed knife 26 and the knives of rotor 28. If the downward bias on pad 54 is too great, then the material cannot be forced between the pressure plate and the table without damage or wrinkling the material. On the other hand, if the bias is not sufficient to hold the material slidably but snugly between the forward edge of the pressure plate and the table, then the material will flutter with resulting poor quality of cut, and increased noise. Therefore, the actual adjustment used is within the realm of experience gained by use of the apparatus.

As to the FIG. 1 embodiment, in the event that the plastic material being fed is not uniform in thickness, and a thicker section reaches the nip rolls 8, then these nip rolls will be permitted to rise under the somewhat resilient bias downward exerted by the pistons 50, particularly if the cylinders are air-driven. Since the fingers 16 are connected to the bar 14 connecting the bearing blocks 12 for the nip rolls, these fingers will also rise an equal amount.

In similar manner, as the thickness of material travels beneath plate 32, it can rise due to the resilient downward bias of main cylinder 38. The pressure pad 54 can also rise due to the resilient downward bias of the safety gate on its forward edge.

Where the toggle mechanism 114 is used, it will permit the forward edge of the support plate 32 to rise, and if the safety gate is used, then the forward edge of the pressure plate may also rise to accommodate any thicker material.

If, alternately, the embodiment using cylinders 94 or the spring mechanism 164–182 are used, it will be noted that by allowing the forward edge of the support plate 32 to rise (by means of the toggle mechanism 114 and its associated apparatus) this will lessen the downward force exerted on the fingers 180, with the result that the pressure plate can also rise to accommodate the thicker material.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. In a machine for cutting sheet material which includes a feed table, cutting means at the inner end of the feed table, and top and bottom feed rolls at the outer end of the feed table for feeding said material along the feed table toward the cutting means, that improvement which comprises
   a. a support plate adapted to be positioned to overlie the feed table between the feed rolls and the cutting means in proximity to the feed table and adapted to be moved away from the latter; the support plate having inner and outer ends extending across the feed table, the outer end being adjacent the feed rolls, and the inner end being spaced from the cutting means a predetermined distance when the support plate is in proximity to the feed table;
   b. a pressure pad having inner and outer edges extending across the feed table, said outer edge being pivotally attached to the inner end of the support plate along an axis, and said inner edge lying in close proximity to the cutting means when the support plate is in proximity to the feed table, the inner edge portion of the pressure pad being movable toward the feed table independently of motion of the support plate;
   c. first resilient means for holding at least the inner end of the support plate in proximity to the feed table; and
   d. second resilient means for resiliently holding the inner edge of the pressure pad in a predetermined but movable position proximate the feed table.

2. The machine of claim 1 in which said first means comprises a fluid operated cylinder and piston combination, one member of said combination being attached to said machine, and the other member of said combination being attached to the support plate.

3. The machine of claim 1 in which said first means comprises a lever having one end pivotally supported on the body of said machine; a bearing mounted on the inner end portion of said support plate, the other end of the lever engaging said bearing; and adjustable spring means engaging the lever and resiliently biasing said other end of the lever in a direction toward the feed table and thereby resiliently holding the inner end of the support plate in proximity to the feed table.

4. The machine of claim 3 wherein said lever is slidable away from the support plate to release the end of the lever from said bearing, thereby to permit the support plate to be moved away from the feed table.

5. The machine of claim 1 in which said second means comprises a fluid operated cylinder and piston combination, one member of said combination being connected to the support plate, and the other member of said combination piston being connected to the pressure pad.

6. The machine of claim 1 in which said second means comprises a safety gate positioned before the cutting means and extending across the feed table, the safety gate being movable toward and away from the pressure pad and the feed table, and having a lower edge adapted to engage the pressure pad to bias the latter toward the feed table; and third means for moving the safety gate toward and away from the pressure pad and the feed table, said third means applying a resilient force to the safety gate.

7. The machine of claim 1 in which said second means comprises first upright support means mounted on the inner end portion of the support plate; second upright support means mounted on the pressure pad and in alignment with the first support means in a direction perpendicular to said axis; and a compression spring mounted under compression between said first and second support means thereby to resiliently bias and hold the inner edge of the pressure pad in said predetermined position.

8. The machine of claim 2 in which said second means comprises a fluid operated cylinder and piston combination, one member of said combination being connected to said support plate, and the other member of said combination being connected to the pressure pad.

9. The machine of claim 2 in which said second means comprises a first upright support means mounted on the inner end portion of the support plate; second upright support means mounted on the pressure pad and in alignment with the first support means in a direction perpendicular to said axis; and a compression spring mounted under compression between said first and second support means thereby to resiliently bias and hold the inner edge of said pressure pad in said predetermined position.

10. The machine of claim 2 in which said second means comprises a safety gate positioned before the cutting means and extending across the feed table; the safety gate being movable toward and away from the pressure pad and the feed table, and having a lower edge adapted to engage the pressure pad and bias the latter toward the feed table; and third means for moving the safety gate toward and away from the pressure pad and the feed table, the third means applying a resilient force to the safety gate.

11. The machine of claim 3 in which said second means comprises a fluid operated cylinder and piston combination, one member of said combination being connected to the support plate, and the other member of said combination being connected to the pressure pad.

12. The machine of claim 3 in which said second means comprises a first upright support means mounted on the inner end portion of the support plate; second upright support means mounted on the pressure pad and in alignment with the first support means in a direction perpendicular to said axis; and a compression spring mounted under compression between the first and second support means thereby to resiliently bias and hold the inner edge of the pressure pad in said predetermined position.

13. The machine of claim 3 in which said second means comprises a safety gate positioned before the cutting means and extending across the feed table, the safety gate being movable toward and away from the pressure pad and the feed table, and having a lower edge adapted to engage the pressure pad and bias the latter toward the feed table; and third means for moving the safety gate toward and away from the pressure pad and the feed table, the third means applying a resilient force to the safety gate.

14. The machine of claim 6 including a control system therefor, comprising
 a. said first means for moving the support plate and the pressure pad toward and away from the feed table;
 b. said third means for moving the safety gate toward and away from the pressure pad; and
 c. control means which upon manual actuation thereof causes actuation of the first and third means in the following first and second sequences:
 d. First sequence:
  1. The third means is actuated to move the safety gate away from the pressure pad;
  2. The first means is actuated to move the support plate and pressure pad away from the feed table and draw the pressure pad out from beneath the safety gate; and
  3. The third means is actuated to move the safety gate toward the feed table to a safety position wherein it prevents access to the cutting mechanism.
 e. Second sequence:
  4. The third means is actuated to move the safety gate away from the feed table to a position at which the pressure pad may be repositioned underneath the safety gate;
  5. The first means is actuated to move the support plate and pressure pad to proximity with the feed table; and
  6. The third means is actuated to move the safety gate toward the pressure pad in position to bear thereagainst.

15. The machine of claim 14 in which said first and third means are pneumatic cylinders, and said control means comprises a plurality of pilot valves and control valves, the pilot valves when actuated, directing the control valves to operate automatically the first and third means in said first and second sequences.

16. The machine of claim 1 including a safety gate movable toward and away from the table between the inner edge of the pressure pad and the cutting means, the safety gate abutting the rear portion of the bed knife when the safety gate is moved toward the table, the inner edge of the pressure pad being provided with sealing means adapted to bear against the safety gate when the latter is in the positions it occupies when the cutting means is operating, and when the safety gate has been moved to abut the bed knife.

* * * * *